Jan. 13, 1959 W. J. HAMPSHIRE ET AL 2,868,439

PLASTIC AXIAL-FLOW COMPRESSOR FOR GAS TURBINES

Filed May 7, 1954 5 Sheets-Sheet 1

INVENTORS
William J. Hampshire &
Raymond R. Lepore
BY
A H Oldham
ATTORNEY

PLASTIC AXIAL-FLOW COMPRESSOR FOR GAS TURBINES

Filed May 7, 1954

INVENTORS
William J. Hampshire &
Raymond R. Lepore

BY

A H Oldham
ATTORNEY

Jan. 13, 1959 W. J. HAMPSHIRE ET AL 2,868,439

PLASTIC AXIAL-FLOW COMPRESSOR FOR GAS TURBINES

Filed May 7, 1954 5 Sheets-Sheet 3

INVENTORS
William J. Hampshire &
Raymond R. Lepore
BY
A H Oldham
ATTORNEY

PLASTIC AXIAL-FLOW COMPRESSOR FOR GAS TURBINES

Filed May 7, 1954 5 Sheets-Sheet 4

INVENTORS
William J. Hampshire &
Raymond R. Lepore
BY
A. H. Oldham
ATTORNEY

INVENTOR.
William J. Hampshire &
BY Raymond R. Lepore
A. H. Oldham
ATTORNEY 2,868,439

PLASTIC AXIAL-FLOW COMPRESSOR FOR GAS TURBINES

William J. Hampshire, Cuyahoga Falls, and Raymond R. Lepore, Akron, Ohio, assignors to Goodyear Aircraft Corporation, Akron, Ohio, a corporation of Delaware Application May 7, 1954, Serial No. 428,255

5 Claims. (Cl. 230—122)

This invention relates to the construction of an axial-flow multi-stage compressor for gas turbines and in particular to a low pressure section thereof of which the rotor and the stator assemblies are made substantially of plastic material such as glass fibre reinforced thermosetting plastics. This type of construction is applicable for temperatures not to exceed 500° F. which is the temperature which available resins today will resist.

Hitherto it has been the practice to make gas turbine compressors of metal having the rotor blades rigidly fastened to a drum-like hub and the outer ends of the stator vanes rigidly connected to the compressor casing. A metal construction for such compressors, however, has the disadvantage that it is heavy and that the blades of the rotor, as well as the vanes of the stator, are subjected to cantiliver bending forces with resulting fatigue.

It is the general object of the invention to avoid and overcome the foregoing and other difficulties of and objections to prior art practices by the provision of rotor blade and stator vane assemblies made of glass fibre reinforced thermosetting plastic material, hereinafter called "glass fibre."

Another object of the invention is to avoid subjecting the rotor blades and the stator vanes to cantiliver bending action.

Another object of the invention is to reduce the compressor weight, manufacturing cost and consumption of critical material.

The aforesaid objects of the invention, and other objects which will become apparent as the description proceeds, are achieved by the provision of an axial flow compressor including a fixed casing and a rotatable hub therein, a plurality of pairs of axially-spaced stator vane supporting rings inserted in said casing flush with the inside surface thereof, sets of stator vanes fitting with their radially outer ends between the rings of each pair of said stator vane supporting rings, a shroud ring holding the radially inner ends of each set of vanes, pivotal connecting means between said outer vane ends and said supporting rings and between the inner ends of said vanes and said shroud rings, sets of rotor blades carried by the hub between said stator blades, and pivotal connecting means between said rotor blades and said hub, said pivotal connecting means between the outer vane ends and their supporting means and between the rotor blades and the hub each having its pivotal axis substantially parallel to the chord of the respective vane or blade through which it passes.

For a better understanding of the invention reference should be had to the accompanying drawings, wherein Fig. 1 shows one-half of a longitudinal cross-sectional view of one embodiment of the invention;

Figures 2, 11, 12, 13, 14:
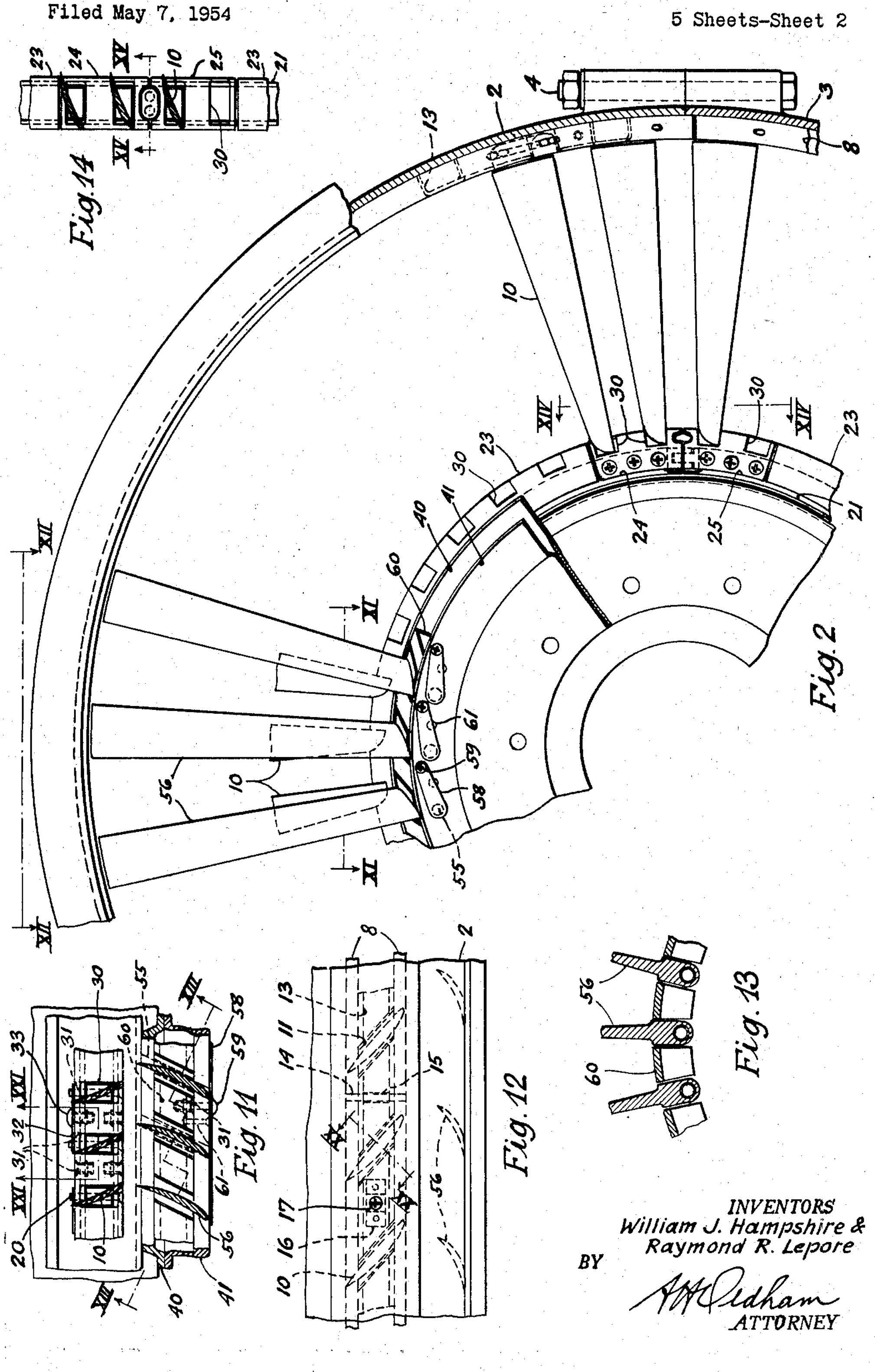
Fig. 2 is a fragmentary front end view of Fig. 1 with one portion thereof having the first stage of the rotor blades removed and with the casing shown in cross-section taken on line II—II of Fig. 1.
Fig. 11 is a fragmentary cross-sectional view taken on line XI—XI of Fig. 2.
Fig. 12 is a fragmentary circumferential view taken on line XII—XII of Fig. 2.
Fig. 13 is a cross-sectional view of the blade attachment taken on line XIII—XIII of Fig. 11.
Fig. 14 is a cross-sectional view at the shroud ring splice taken on line XIV—XIV.
Figure 15:
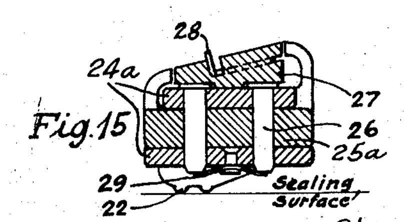
Fig. 15 is an enlarged cross-sectional view taken on line XV—XV of Fig. 14.
Figure 16:
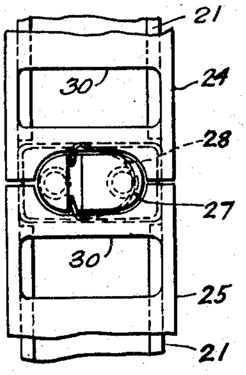
Fig. 16 is a top view of Fig. 15.
Figure 18:
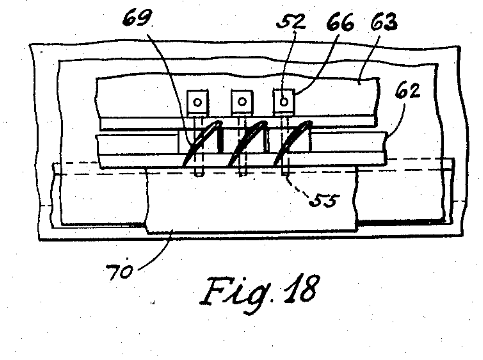
Fig. 18 is a cross-sectional view taken on line XVIII—XVIII of Fig. 17.
Figure 19:
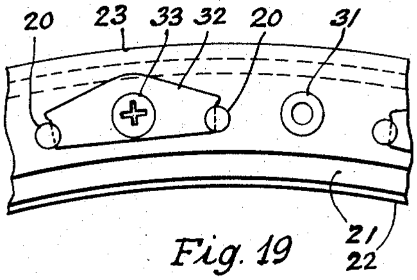
Fig. 19 is a view taken on line XIX—XIX of Fig. 1 of vane pin lock plate.
Figure 20:
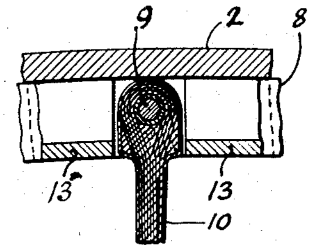
Fig. 20 is a cross-sectional view of the outer vane end mounting taken on line XX—XX of Fig. 12.
Figure 21:
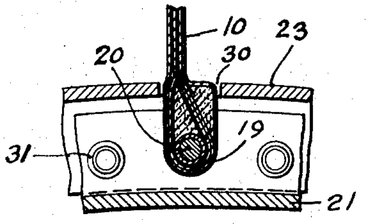
Fig. 21 is a cross-sectional view of the inner vane end attachment taken on line XXI—XXI of Fig. 11.
Figure 22:
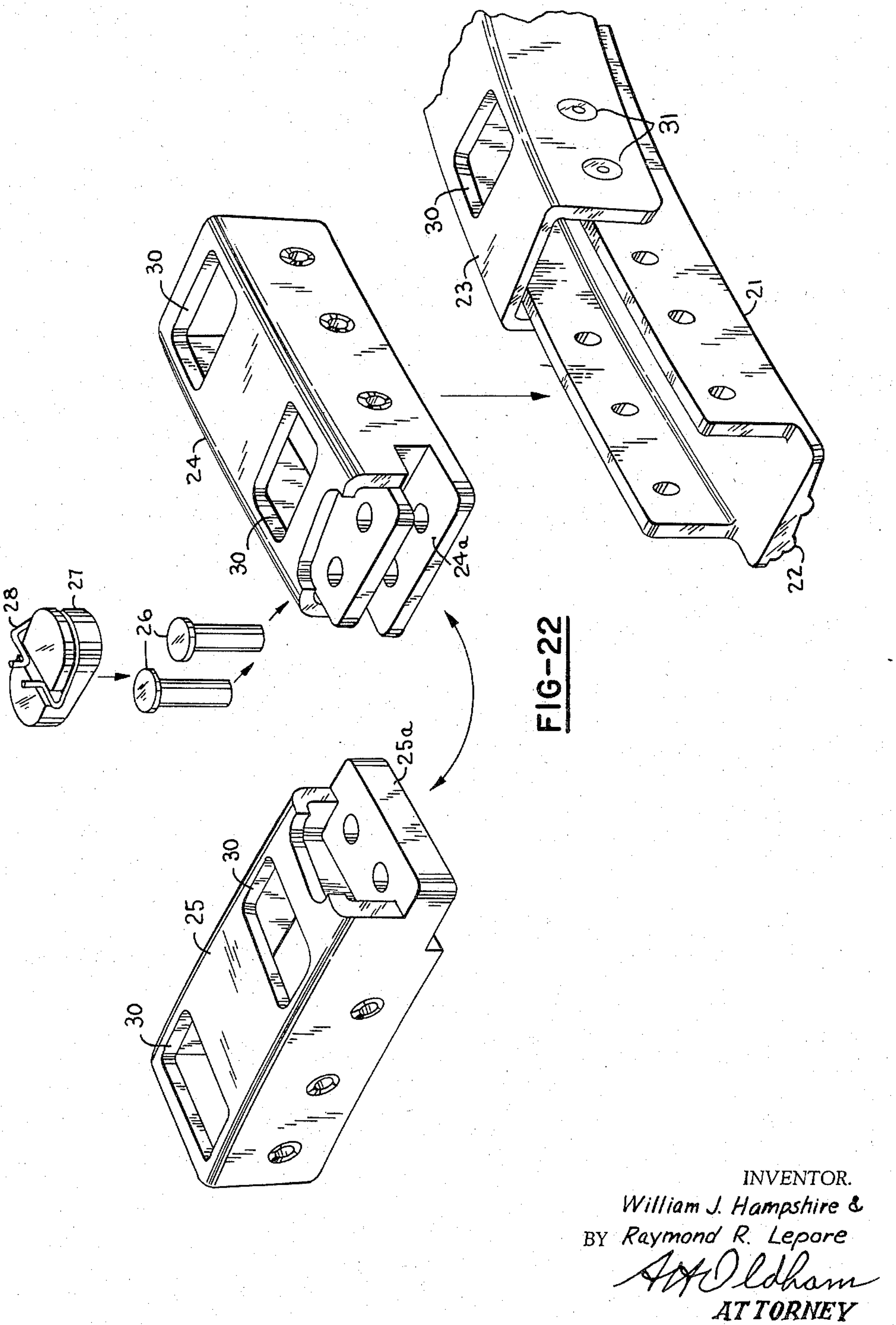
Fig. 22 is an exploded view of Fig. 16 to better illustrate the construction thereof.

With specific reference to the form of the invention illustrated in the drawings, the numeral 1 indicates in general the housing, preferably made of magnesium, of the low pressure portion of a gas turbine compressor and comprising two halves 2 and 3 held together by bolts 4. The housing 1, provided at each stator stage with an annular groove 5, is secured to the front portion 6 and to the rear portion 7 of an existing compressor housing. Into the grooves 5 are inserted pairs of glass fibre vane rings 8, split diametrically in two halves, and between which are swingably mounted on steel pins 9 diagonal to rings 8 the glass fibre stator vanes 10 with their flat roots 11 provided with a bushing 12 for pivotally receiving pin 9 which is substantially parallel with the vane chord, as seen in Fig. 12. Glass fibre spacer blocks 13 of U-cross-section serving as a fairing for the air flow and of slightly smaller size than the space to be filled are placed between adjacent flat vane roots 11 and are fixed by pins 14 and spacers 15 to the vane rings 8. Some of the spacer blocks 13 are provided with rivet nuts 16 and are secured by screws 17 to the casing 1 to prevent turning of the vane rings 8 therein. The inner flat ends 18 of the vanes 10, running parallel with the compressor axis, are provided with steel bushings 19 and are pivotally fastened by pins 20 axial of the turbine to a glass fibre shroud ring 21 made diametrically split into two halves having U-shaped cross-section and provided on its inner circumference with corrugations 22 for air sealing purposes. The outer circumference of the shroud ring 21 is covered by a glass fibre fairing ring consisting of two circumferential parts 23 of cross-sectionally inverted U-shape spaced apart at their ends by interlocking steel fittings 24 and 25 which also serve to join together the ends of shroud ring halves 21. Pins 26 extending radially through tongue 25*a* and groove 24*a* portions of fittings 24 and 25 serve to join the fittings together. The pins 26 are held in place by a retaining block 27 which is secured in place by a releasable spring 28 whose edges engage in grooves in the ends of fittings 24 and 25. See Figures 15, 16 and 22. For easy removal of the pins 26 a flat spring 29 is riveted to the bottom of one of the fittings and presses against the pin ends to lift the pins somewhat after the retaining block 27 has been removed. The shroud fairing parts 23, 24 and 25 all have openings 30 for passing therethrough the inner ends of the stator vanes 10 and the parts 23, 24 and 25 are fastened to the shroud ring 21 by circumferentially-spaced rivnuts 31. The pins 20 of the inner vane ends are secured in pairs, each pair by a steel lock plate 32 whose ends engage in slots in the ends of pins 20. See Figs. 11 and 19. Each plate 32 is fastened by a screw 33 threading into a tapped hollow bore of a rivnut 31. By tying the inner ends of the stator vanes together by a shroud ring in the manner described the vanes are capable of resisting the gas forces to which they are subjected, although they are not rigidly attached at their root ends to the vane rings 8 in the casing 1.

Figure 9:
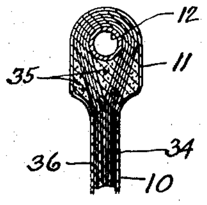
Fig. 9 is a cross-sectional view taken on line IX—IX of Fig. 7.
Figure 7:
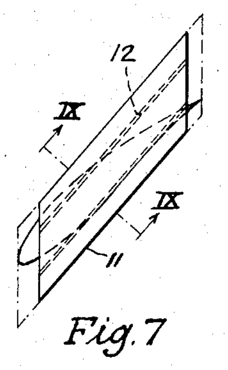
Fig. 7 is a top view taken on line VII—VII of Fig. 6.
Figure 10:
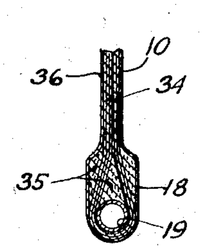
Fig. 10 is a cross-sectional view taken on line X—X of Fig. 8.
Figure 6:
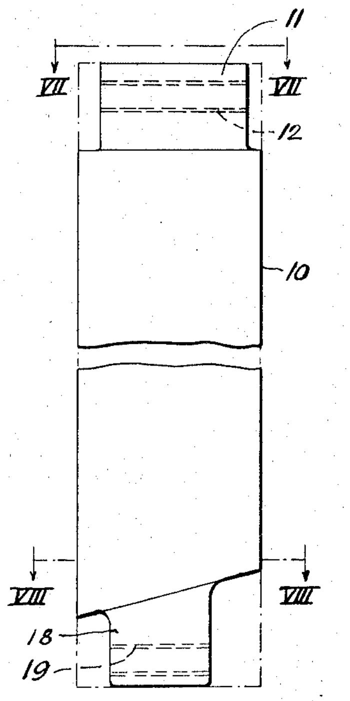
Fig. 6 is a side view of a stator vane.

The stator vanes 10 are made either of glass fibre cloth or glass fibre strands 34 laid in as many layers, as required, around the steel bushings 12 and 19, respectively, so that the full tensile strength of the glass fibres can be utilized most efficiently. For building up both ends of the vanes to the shape shown (Figs. 9 and 10), a glass fibre molding compound 35 is used and the entire vane assembly is wrapped with two layers 36 of glass fibre cloth before pressforming and curing of the blades takes place. Both vane ends are then machined to the desired width to provide a slight clearance between the vane rings 8 and shroud rings 21, respectively, and to allow for easy assembly and flexibility.

Figure 1:
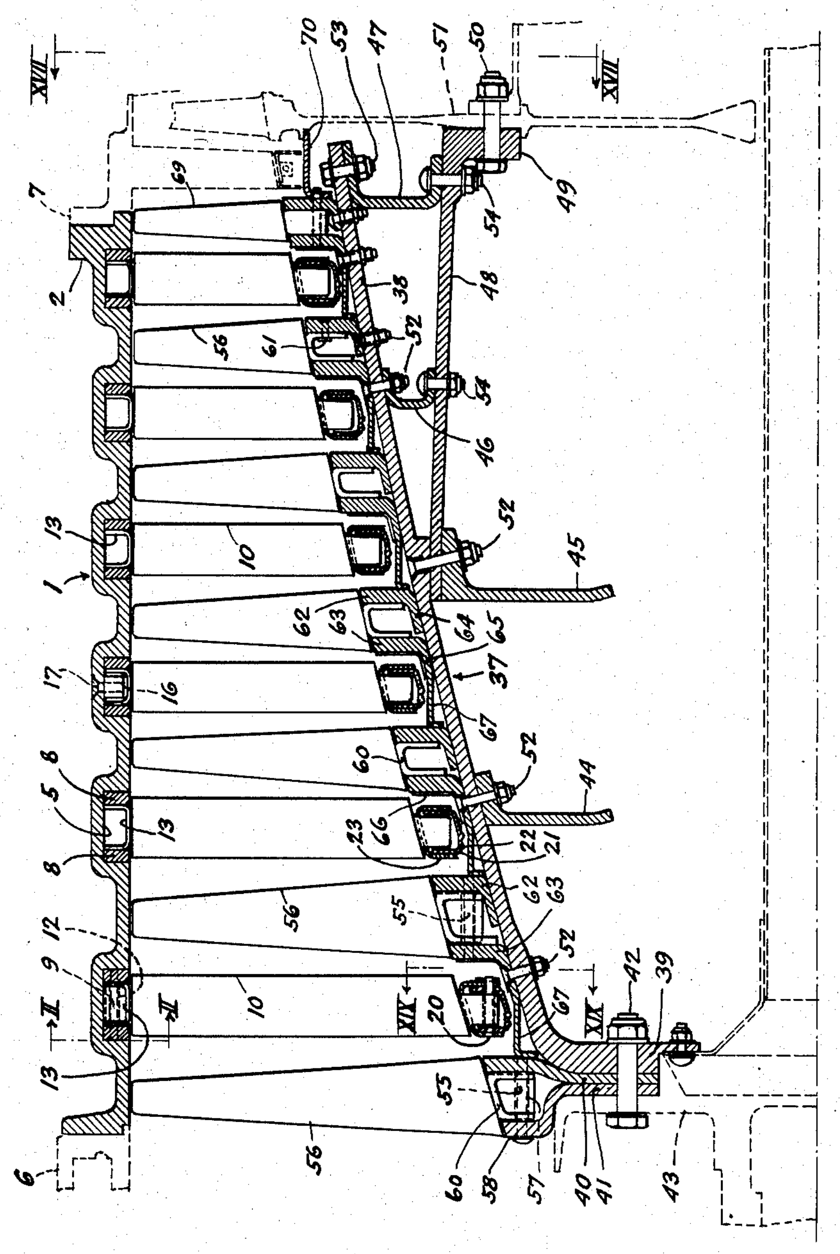

The rotor assembly 37 is made, with exception of the fasteners, completely of glass fibre and includes a drum-like hub 38 of rearwardly increasing diameter and of convexly curved longitudinal contour. The hub 38 is provided at its front end with an inwardly turned flange 39. A pair of blade attachment rings 40 and 41 for the first rotor blade stage are connected by bolts 42, together with flange 39, to a flanged stub shaft 43. On the inside, the hub 38 is reinforced by flanged rings 44, 45, 46 and 47, the last two having U-shaped cross-sections. A substantially cylindrical member 48 having an inwardly turned end flange 49 is connected by bolts 50 to a rear compressor rotor section 51. The rings 44, 45, 46 and 47 are secured to the hub 38 by bolts 52 and 53 and to the cylinder 48 by bolts 54. Pins 55 diagonally disposed to the axis of rotation of the turbine carried between the spaced outer portions of the rings 40 and 41, as seen in Fig. 11, support rotor blades 56 provided with steel bushings 57 for pivotally engaging the pins. To one end of the pins 55 are brazed clips 58 (Fig. 2) which are fastened by screws 59 to rivnuts 31 in turn fixed to spacer blocks 60 held in position by rivets 61, said blocks 60 serving as fairing means between the rotor rings 40 and 41. Rearwardly of the first blade stage there are provided a plurality of additional stages each being defined by blade fastening rings 62 and 63 spaced from each other and having flanges 64 and 65, respectively, fastened by the bolts 52 to the rotor hub 38. The bolts 52 also hold in place angular retaining clips 66 brazed to the blade pins 55. Both flanges 64 and 65 face forwardly and the flange 65 has a cylindrical flanged extension 67 in contact with the rear ring 62 of the set of rings in front thereof. The extension 67 is of such diameter in each stage as to act together with the corrugations 22 on the shroud ring 21 substantially as an air seal. As seen in Fig. 1, at the outer ends of the stator vanes, the radially-inner surface of spacer blocks 13 inserted between the outer ends of the stator are flush with the radially inner surface of the housing 1. At the inner ends of the stator vanes the radially outer surface of fairing 23 is flush with the outer surface of the spacer blocks 60 between the rotor blade roots. Thus, a smooth air flow is provided through the compressor section.

Figure 5:
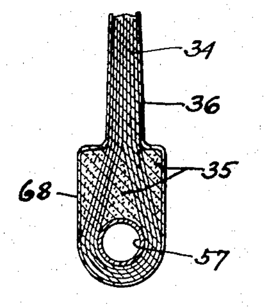
Fig. 5 is a fragmentary longitudinal cross-sectional view taken on line V—V of Fig. 4.
Figure 8:
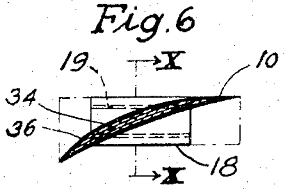
Fig. 8 is a cross-sectional view taken on line VIII—VIII of Fig. 6.
Figure 17:
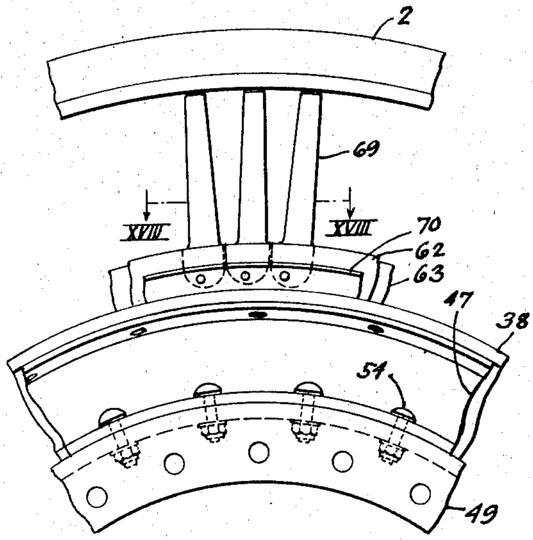
Fig. 17 is a fragmentary end view taken on line XVII—XVII of Fig. 1.

The rotor blades 56 are of a construction similar to that of the stator vanes 10. The glass fibres either in form of layers of glass fibre cloth or of glass fibre strands 34 are slung around the bushing 57 in a sufficient number of layers to produce the necessary blade thickness and with the root ends 68 being formed as seen in Fig. 5 by fillers 35 of fibre glass molding compound. A double wrapping 36 of glass fibre cloth around the blade completes the blade assembly which receives its final shape by press-forming and curing. The blade root 68 is then machined to the desired width. With a small clearance between the blade roots 68 and the spacer blocks 60 (see Fig. 13) the blades are slightly tiltable and are not fastened fixedly so that as soon as the rotor turns at sufficient speed there will be no cantilever bending of the blades, because centrifugal force comes into play to keep the blades 56 floating and away from the spacer blocks 60 against the bending forces acting upon the blades.

Figure 3:
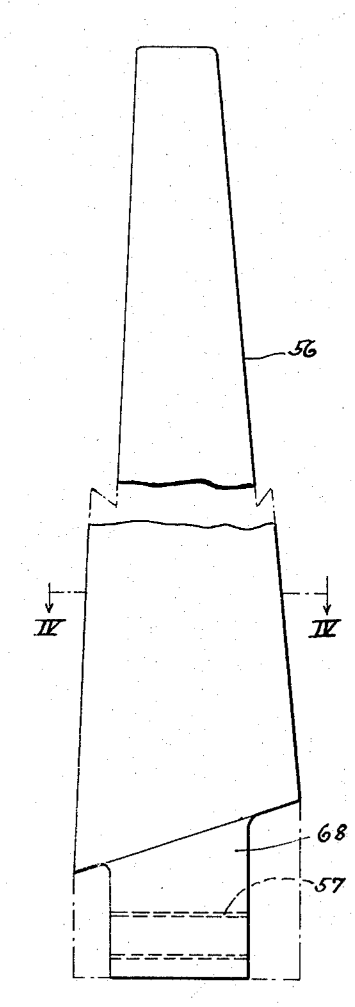
Fig. 3 is a side view of a rotor blade.
Figure 4:
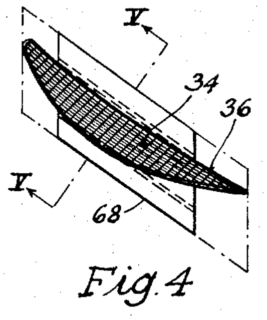
Fig. 4 is a cross-sectional view taken on line IV—IV of Fig. 3.

The rotor blades 69 at the rear stage are for structural reason of somewhat modified construction from those in front thereof. Specifically, the roots of blades 69 are made circumferentially wider and spacer blocks 60 therebetween omitted, with the root portions themselves serving as fairing. The blade pins have their axes parallel to the chord of the blade and diagonal to the axis of rotation of the turbines as seen in Figs. 3, 4 and 11. A sealing ring 70 is inserted between the rotor assembly 37 and the rear rotor section 51.

As will be seen from the drawing considered in conjunction with the foregoing description, the pivotal supporting means for the inner ends of the stator vanes lie substantially parallel to the hub axis, whereas the pivotal supporting means for the rotor blades and the outer ends of the stator vanes lie at an angle to the hub axis and substantially in the plane of the end of the blade or vane nearest the pivotal support.

The invention has been illustrated as employed in the construction of the low pressure section of an axial flow multi-stage compressor of a gas turbine, however, it would be equally applicable for a complete compressor, provided the resulting temperature is such that it can be safely resisted by the plastic material.

While certain representative embodiments and details have been shown for the purpose of illustrating the invention, it will be apparent to those skilled in this art that various changes and modifications may be made therein without department from the spirit or scope of the invention.

What is claimed:

1. For a gas turbine a multi-stage axial flow compressor having a low pressure section including a casing provided inside with a plurality of annulur grooves spaced from each other, a flanged front rotor stub shaft, a rear rotor section, a front low pressure rotor section within said casing and being connected to said stub shaft and to said rear rotor section, a stator vane assembly mounted in and fixed in each of said grooves, the front rotor section and the stator vane assemblies being substantially made of glass fibre reinforced thermosetting plastic material, said front rotor section consisting of a longitudinally-curved drum-like hollow hub increasing in diameter rearwardly and having at front an inwardly turned flange for attachment to said rotor stub shaft, an inside structure for stiffening said hub and being provided with an end flange fastened to said rear rotor section, a spaced pair of rotor blade mounting rings at each rotor blade stage being secured to the outside of said hub, said mounting rings, except the first pair, being of angular cross section having one leg facing forwardly in contact with the hub and the other leg extending radially therefrom, the hub contacting leg being provided with a forwardly extending interstage seal surface, rotor blades pivotally mounted between each pair of said rings, spacer blocks fixed to and being flush with said pairs of rings between adjacent rotor blades, a stator vane assembly between adjacent rotor blade stages, each of said vane assemblies consisting of a pair of spaced rings inserted in said annular casing grooves, vanes with their outer ends pivotally mounted between said stator rings, spacer blocks between outer vane ends and flush with the inner casing surface, shroud rings of U-shaped cross-section closely surrounding in substantially sealing distance said interstage seal surface, fairing rings for closing the open side of said shroud rings and being longitudinally flush with said rotor blade mounting rings, said fairing rings having openings for receiving the stator vanes, and means pivotally securing the inner ends of the stator vanes to the shroud rings and fairing rings.

2. For a gas turbine a multi-stage axial flow compressor having a low pressure section including a casing provided inside with a plurality of spaced annular grooves, a rotor assembly within said casing, a stator assembly mounted in each of said grooves, the rotor assembly and the stator assemblies being made substantially of glass fibre reinforced thermosetting plastic material, said rotor assembly consisting of a longitudinally curved, drum-like, hollow hub increasing in diameter rearwardly and having an inside stiffening structure, a plurality of longitudinally spaced pairs of rotor blade mounting rings of angular cross-section secured to the outside of said hub, one leg of said mounting rings extending radially and the other leg thereof facing forwardly lying on the hub surface, sets of rotor blades, the blades of each set being pivotally mounted between a pair of said rings, spacer blocks fixed to said pairs of rings between adjacent rotor blades, a stator vane assembly between adjacent rotor blade sets, each of said vane assemblies consisting of a pair of spaced rings inserted in said annular casing grooves, stator vanes with their outer ends pivotally mounted between said stator rings, shroud rings of U-shaped cross-section closely surrounding in substantially sealing distance the forward hub rings holding the rotor blades, fairings for said shroud rings closing the top thereof and being flush with the top of said rotor blade mounting rings, said fairings having openings receiving therein the stator blades, and means pivotally securing the inner ends of the stator vanes to the shroud ring and to said fairing.

3. For a gas turbine an axial flow compressor including a fixed casing and a rotatable hub therein, a plurality of axially-spaced stator vane supporting means inserted in said casing flush with the inside surface thereof, sets of stator vanes fitting with their radially outer ends in said stator vane supporting means, a shroud ring holding the radially inner ends of each set of vanes, a pivotal connecting means between said outer vane ends and said supporting means and between the inner ends of said vanes and said shroud rings, a plurality of axially-spaced sets of rotor blades carried by the hub between said stator blades, and pivotal connecting means between said rotor blades and said hub, said pivotal connecting means allowing limited movement of the vanes in the casing and allowing limited movement of the blades on the hub, said pivotal connecting means between said outer vane ends and their supporting means and said connecting means between the rotor blades and the hub being positioned substantially parallel to the chord of the end of the blade or vane through which its pivotal axis passes.

4. For a gas turbine an axial flow compressor including a fixed casing and a rotatable hub therein, a plurality of pairs of spaced stator vane supporting rings inserted in said casing flush with the inside surface thereof, a plurality of sets of stator vanes, each set of stator vanes fitting with their radially outer ends between the rings of one pair of stator vane rings, a shroud ring holding the radially inner ends of each set of vanes, pivotal connecting means between said outer vane ends and said supporting rings and between the inner ends of said vanes and said shroud rings, sets of rotor blades carried by the hub between said stator blades, and pivotal connecting means between said rotor blades and said hub, said pivotal connecting means between said outer vane ends and their supporting rings and said connecting means between the rotor blades and the hub being positioned substantially parallel to the chord of the end of the blade or vane through which its pivotal axis passes.

5. For a gas turbine an axial flow compressor including a fixed casing and a rotatable hub therein, a plurality of pair of axially spaced stator vane supporting rings inserted in said casing flush with the inside surface thereof, sets of stator vanes fitting with their radially outer ends between the rings of each pair of said stator vane supporting rings, a shroud ring holding the radially inner ends of each set of vanes, pivotal connecting means between said outer vane ends and said supporting rings and between the inner ends of said vanes and said shroud rings, sets of rotor blades carried by the hub between said stator blades, and pivotal connecting means between said rotor blades and said hub, the radially outer surface of said last named connecting means being substantially flush with the radially outer surface of the shroud rings, the inner pivotal connecting means of the vanes running parallel to the rotor axis and the other pivotal connecting means of the vanes and of the rotor blades running parallel to the chord of the respective blade or vane through which it passes.

References Cited in the file of this patent

UNITED STATES PATENTS

| | | |
|---|---|---|
| 1,035,364 | Leblanc | Aug. 13, 1912 |
| 2,621,140 | Bitterli et al. | Dec. 9, 1952 |
| 2,640,679 | Wheatley et al. | June 2, 1953 |
| 2,671,634 | Morley | Mar. 9, 1954 |
| 2,685,405 | Stalker | Aug. 3, 1954 |
| 2,718,349 | Wilde | Sept. 20, 1955 |
| 2,747,367 | Savin | May 29, 1956 |

FOREIGN PATENTS

| | | |
|---|---|---|
| 302,953 | Great Britain | Dec. 21, 1928 |
| 586,562 | Great Britain | Mar. 24, 1947 |